(12) United States Patent
Russell

(10) Patent No.: US 12,160,743 B2
(45) Date of Patent: Dec. 3, 2024

(54) METHODS, SYSTEMS, AND COMPUTER READABLE MEDIA FOR PROVIDING CALL INTELLIGENCE TO A SIGNALING FIREWALL IN A COMMUNICATIONS NETWORK

(71) Applicant: Oracle International Corporation, Redwood Shores, CA (US)

(72) Inventor: Travis Earl Russell, Clayton, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 362 days.

(21) Appl. No.: 17/579,033

(22) Filed: Jan. 19, 2022

(65) Prior Publication Data
US 2023/0232232 A1    Jul. 20, 2023

(51) Int. Cl.
*H04W 12/088*    (2021.01)
*H04W 8/02*    (2009.01)
(Continued)

(52) U.S. Cl.
CPC ........... *H04W 12/088* (2021.01); *H04W 8/02* (2013.01); *H04W 8/18* (2013.01); *H04W 12/63* (2021.01)

(58) Field of Classification Search
CPC ... H04W 12/088; H04W 12/08; H04W 12/12; H04W 12/128; H04W 12/48; H04W 4/16;
(Continued)

(56) References Cited

U.S. PATENT DOCUMENTS 9,749,296 B1 *   8/2017   Kaushik .............. H04L 61/2564
10,952,063 B2    3/2021   Mehta
(Continued)

FOREIGN PATENT DOCUMENTS

EP    4216591    7/2023

OTHER PUBLICATIONS

Notice of Publication for European Patent Application 23151789.7 (Jun. 28, 2023).
(Continued)

*Primary Examiner* — Golam Sorowar
(74) *Attorney, Agent, or Firm* — Jenkins, Taylor & Hunt, P.A.

(57) ABSTRACT

A method for providing call intelligence to a signaling firewall in a communications network includes collecting, by a network security service component, call session data from incoming and outgoing calls involving a mobile device and providing, by the network security service component, the call session data to a signaling firewall via an application programming interface (API). The method further includes receiving, by the signaling firewall, an update location request message associated with the mobile device, extracting signaling message information that includes current location data and timestamp data from the received update location request message, and utilizing the current location data and the timestamp data to identify a correlated portion of the call session data. The method further includes providing the signaling message information and the correlated portion of the call session data to a security analytics engine platform for a location validation assessment and allowing or rejecting, by the signaling firewall, the update location request message based on location validation assessment data received from the security analytics engine platform.

17 Claims, 4 Drawing Sheets

(51) Int. Cl.
*H04W 8/18* (2009.01)
*H04W 12/63* (2021.01)

(58) Field of Classification Search
CPC ..... H04W 8/04; H04W 84/042; H04W 92/02; H04W 8/02; H04W 80/04; H04W 12/06; H04W 76/12; H04W 36/02; H04W 36/08; H04W 36/38; H04W 8/08; H04W 76/10; H04W 88/16; H04W 12/73; H04W 12/068; H04W 12/106; H04W 12/108; H04W 24/08; H04W 4/00; H04W 4/06; H04W 4/14; H04W 4/24; H04W 60/04; H04W 64/00; H04L 63/20; H04L 63/0236; H04L 63/029; H04L 63/1408; H04L 63/0263; H04L 65/1069; H04L 63/1433; H04L 63/1441; H04L 63/0209; H04L 63/10; H04L 63/168; H04L 63/0254; H04L 63/1425; H04L 63/0876; H04L 65/1101; H04L 67/02; H04L 69/16; H04L 63/1416; H04L 69/22; H04L 63/164; H04L 63/166; H04L 65/401; H04L 61/2564; H04L 61/2575; H04L 61/2578; H04L 65/1083; H04L 65/1095; H04L 65/403

See application file for complete search history.

(56) References Cited

U.S. PATENT DOCUMENTS

| | | | |
|---|---|---|---|
| 11,838,756 B2* | 12/2023 | Li | H04W 4/60 |
| 2006/0009195 A1 | 1/2006 | Itoh | |
| 2010/0029272 A1* | 2/2010 | McCann | H04W 4/16 |
| | | | 455/433 |
| 2019/0007788 A1* | 1/2019 | Russell | H04W 4/02 |
| 2020/0007538 A1* | 1/2020 | Mehta | H04L 63/0876 |
| 2021/0058507 A1* | 2/2021 | Cornwell | H04M 3/2218 |
| 2023/0328035 A1* | 10/2023 | Poinsard | H04L 63/0263 |
| | | | 726/13 |

OTHER PUBLICATIONS

European Search Report for European Patent Application 23151789.7 (May 22, 2023).

* cited by examiner

METHODS, SYSTEMS, AND COMPUTER READABLE MEDIA FOR PROVIDING CALL INTELLIGENCE TO A SIGNALING FIREWALL IN A COMMUNICATIONS NETWORK

TECHNICAL FIELD

The subject matter described herein relates to employing fraud prevention measures in mobile communications networks. More particularly, the subject matter described herein relates to methods, systems, and computer readable media for providing call intelligence to a signaling firewall in a communications network.

BACKGROUND

Mobile communications networks are expanding and utilize multiple technologies and interconnects to carry signaling messages used to establish communications over the networks. A problematic scenario that typically arise in such networks involves a malicious actor (e.g., a hacker) that sends a location update signaling message into the network that indicates that a mobile device has roamed and/or entered into the malicious actor's fictious network. Notably, the location update signaling message serves as a request that all traffic associated with the mobile subscriber should be directed to the malicious actor (i.e., the malicious actor's 'network'). One attempt to prevent such behavior involves a signaling firewall configured to validate the received location update signaling message via a velocity check mechanism configured by provisioned rules. For example, the signaling firewall can be configured to determine the possibility that a mobile device moved from a first network location to a second network location. However, configuring such a velocity check is commonly understood to be difficult to implement. For example, generating the requisite database containing entries of possible travel times between hundreds of cities poses significant challenges. As such, customers ignore this signaling firewall functionality because provisioning such a database is too labor-intensive.

Accordingly, there exists a need for improved methods and systems for providing call intelligence to a signaling firewall in a communications network.

SUMMARY

The subject matter described herein includes a methods, systems, and computer readable media for providing call intelligence to a signaling firewall in a communications network. One method includes collecting, by a network security service component, call session data from incoming and outgoing calls involving a mobile device and providing, by the network security service component, the call session data to a signaling firewall via an application programming interface (API). The method further includes receiving, by the signaling firewall, an update location request message associated with the mobile device, extracting signaling message information that includes current location data and timestamp data from the received update location request message, and utilizing the current location data and the timestamp data to identify a correlated portion of the call session data. The method further includes providing the signaling message information and the correlated portion of the call session data to a security analytics engine platform for a location validation assessment and allowing or rejecting, by the signaling firewall, the update location request message based on location validation assessment data received from the security analytics engine platform.

According to another aspect of the method described herein, the signaling message information further includes mobile subscriber identification information corresponding to the mobile device.

According to another aspect of the method described herein, the call session data includes at least one of a calling party number, a called party number, timestamp data, a call treatment designation, a location identifier, a mobile device type identifier, and originating carrier identifier, and a terminating carrier identifier.

According to another aspect of the method described herein, the call session data relates to update location request messages previously received by the signaling firewall.

According to another aspect of the method described herein, rejecting the update location request message in response to utilizing the location validation assessment data to designate the update location request message as a suspicious message.

According to another aspect of the method described herein, the security analytics engine platform includes a machine learning component configured to formulate the location validation assessment based on the signaling message information and associated call session data received from the signaling firewall.

According to another aspect of the method described herein, the security analytics engine platform executes the location validation assessment by comparing the current location data and timestamp information included in the signaling message information with location identifier and timestamp data included in the call session data.

In another embodiment, a system for providing call intelligence to a signaling firewall in a communications network includes a network security service component configured for collecting call session data from incoming and outgoing calls involving a mobile device and a signaling firewall configured for receiving the call session data from the network security service component, receiving an update location request message associated with the mobile device, extracting signaling message information that includes current location data and timestamp data from the received update location request message, and utilizing the current location data and the timestamp data to identify a correlated portion of the call session data. The system further includes a security analytics engine platform configured to receive the signaling message information and the correlated portion of call session data from the signaling firewall, performing a location validation assessment based on the received signaling message information and associated call session data, and providing location validation assessment data to the signaling firewall, wherein the signaling firewall is configured to allow or reject the update location request message based on location validation assessment data.

According to another aspect of the system described herein, the signaling message information further includes mobile subscriber identification information corresponding to the mobile device.

According to another aspect of the method described herein, the call session data includes at least one of a calling party number, a called party number, timestamp data, a call treatment designation, a location identifier, a mobile device type identifier, and originating carrier identifier, and a terminating carrier identifier.

According to another aspect of the method described herein, the call session data relates to update location request messages previously received by the signaling firewall.

According to another aspect of the method described herein, the signaling firewall is further configured for rejecting the update location request message in response to utilizing the location validation assessment data to designate the update location request message as a suspicious message.

According to another aspect of the method described herein, the security analytics engine platform includes a machine learning component configured to formulate the location validation assessment based on the signaling message information and associated call session data received from the signaling firewall.

According to another aspect of the method described herein, the security analytics engine platform executes the location validation assessment by comparing the current location data and timestamp information included in the signaling message information with location identifier and timestamp data included in the call session data.

In another embodiment, a non-transitory computer readable medium having stored thereon executable instructions that when executed by a processor of a computer controls the computer to perform steps that includes collecting, by a network security service component, call session data from incoming and outgoing calls involving a mobile device and providing, by the network security service component, the call session data to a signaling firewall via an application programming interface (API). The non-transitory computer readable medium further includes receiving, by the signaling firewall, an update location request message associated with the mobile device, extracting signaling message information that includes current location data and timestamp data from the received update location request message, and utilizing the current location data and the timestamp data to identify a correlated portion of the call session data. The non-transitory computer readable medium further includes providing the signaling message information and the correlated portion of the call session data to a security analytics engine platform for a location validation assessment and allowing or rejecting, by the signaling firewall, the update location request message based on location validation assessment data received from the security analytics engine platform.

According to another aspect of the non-transitory computer readable medium described herein, the signaling message information further includes mobile subscriber identification information corresponding to the mobile device.

According to another aspect of the non-transitory computer readable medium described herein, the call session data includes at least one of a calling party number, a called party number, timestamp data, a call treatment designation, a location identifier, a mobile device type identifier, and originating carrier identifier, and a terminating carrier identifier.

According to another aspect of the non-transitory computer readable medium described herein, the call session data relates to update location request messages previously received by the signaling firewall.

According to another aspect of the non-transitory computer readable medium described herein, rejecting the update location request message in response to utilizing the location validation assessment data to designate the update location request message as a suspicious message.

According to another aspect of the non-transitory computer readable medium described herein, the security analytics engine platform includes a machine learning component configured to formulate the location validation assessment based on the signaling message information and associated call session data received from the signaling firewall.

According to another aspect of the non-transitory computer readable medium described herein, the security analytics engine platform executes the location validation assessment by comparing the current location data and timestamp information included in the signaling message information with location identifier and timestamp data included in the call session data.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Methods, systems, and computer readable media for providing call intelligence to a signaling firewall in a communications network are disclosed. In particular, the disclosed subject matter pertains to the determination and confirmation of the true location of a particular mobile device at a signaling firewall. In some embodiments, the disclosed subject matter can be implemented using a network security service component (NSSC). As call sessions enter the NSSC residing in an operator's network, the NSSC and/or its associated security management engine can be configured to inspect the calling party number and other call session data to determine the likelihood that the call is being spoofed by malicious actor. As indicated in greater detail below, this information and call session data is provided to one or more signaling firewalls via an application programming interface (API) to assist with similar assessments being performed at the edge or border of a network.

Figure 1:
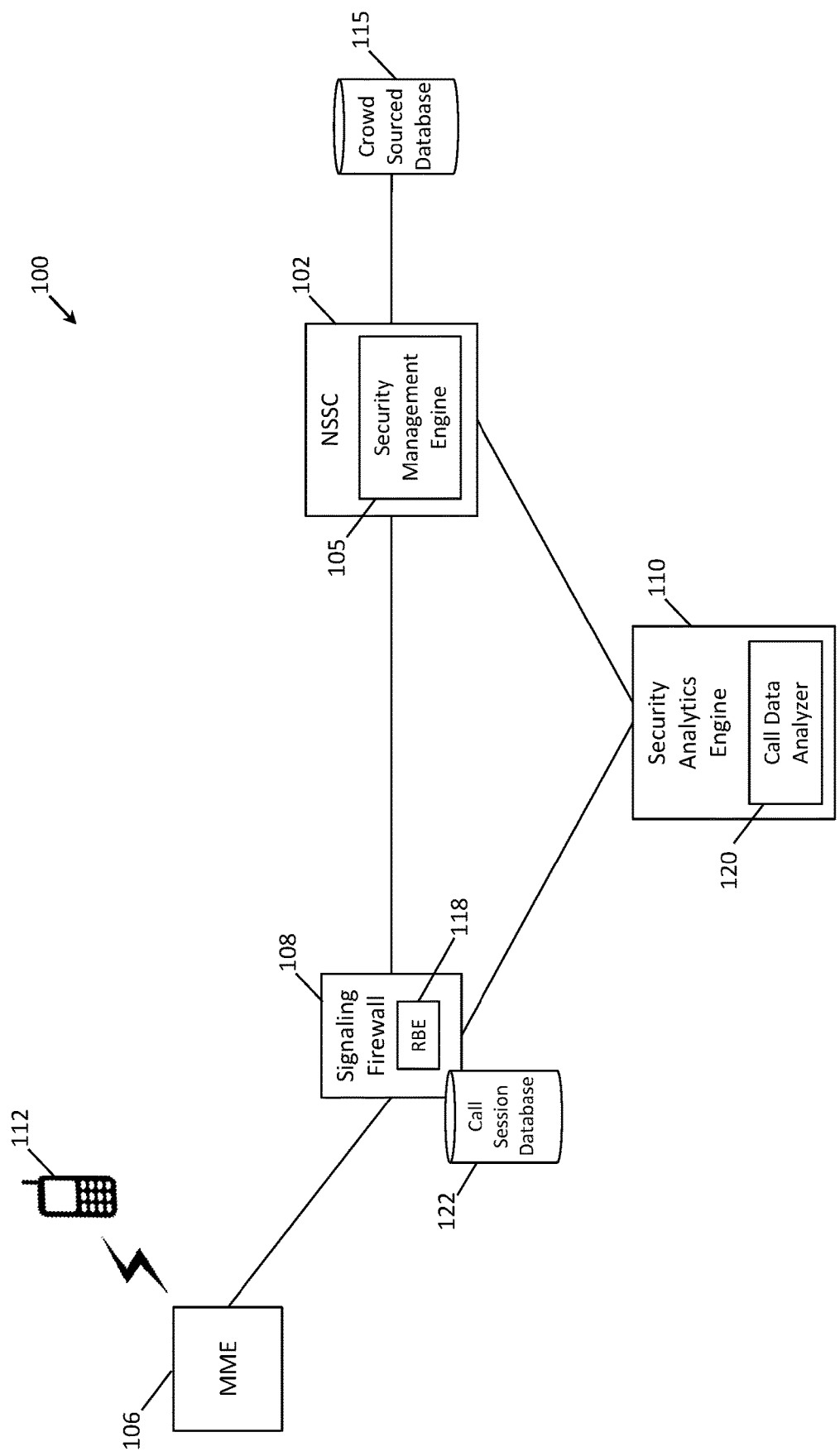
FIG. 1 is a block diagram illustrating an exemplary network for providing call intelligence to a signaling firewall in a communications network according to an embodiment of the subject matter described herein.

FIG. 1 is a block diagram illustrating an exemplary communications network 100 (e.g., operator network) that is configured to facilitate and support the communication of session initiation protocol (SIP)-based telephony calls. As depicted in FIG. 1, communications network 100 includes a network security services component 102, a signaling firewall 108, a security analytics engine 110, and a crowdsourced database 115. FIG. 1 further depicts a mobility management entity (MME) 106 that is providing service to a mobile subscriber's user equipment (UE) 112. Notably, MME 106 may be a home network MME (e.g., if user equipment 112 is located in its home network) or a visited network MME (e.g., if user equipment 112 is roaming).

In some embodiments, network security services component (NSSC) 102 that includes a security management engine 105. In some embodiments, security management engine 105 is configured to collect call session data (i.e., session data from incoming and outgoing calls) from communications network 100. More specifically, security management engine 105 receives and processes call sessions that are supported by the communications network 100. As these call sessions are being conducted, security management engine 105 is configured to collect (e.g., from call session packet traffic) and store call session data corresponding to the call sessions. In some embodiments, the call session data that is collected may include information such as, but not limited to, a calling party number, a called party number, a call origination timestamp, a call termination timestamp, a call session treatment designation (e.g., suspect call vs. not suspect call), location information pertaining to the mobile subscriber device, mobile device type, originating carrier identification, and terminating carrier identification. Notably, the network security services component 102 (and/or its security management engine 105) is a standalone network node that is separate and distinct from signaling firewall 108, which provides network protection by filtering signaling traffic and blocking outside entities attempting to gain unauthorized access to the customer's network.

In addition, security management engine 105 can be configured to utilize any previously collected and stored call activity data to determine a probability that the location of a mobile device is the same as the location indicated (or 'proposed') in the location update signaling message that is received at a signaling firewall. For example, security management engine 105 can be configured to determine if a particular call has been spoofed by a malicious actor or is a robocall (i.e., a call initiated by an automated service). In some embodiments, security management engine 105 is configured to derive a score (e.g., a confidence level score) for each processed call session. The score assigned to the call session may be based, at least in part, on data provisioned in a crowdsourced database 115 where the originating calling party number is verified by security management engine 105. For example, the security management engine 105 can be configured to access crowdsourced database 115, which includes entries containing calling party numbers (e.g., IMSIs) that have been identified as spam generators, robocallers, and/or other malicious actors. The database entries may also include other information associated with call session data. In particular, security management engine 105 is configured to collect call session data from the operator network and compare portions of this data (e.g., calling party IMSI or other mobile subscriber identifiers) to the database entries of crowdsourced database 115. If the security management engine 105 locates one or more matching entries in crowdsourced database 115, security management engine 105 may designate the call session as a suspicious call. If no matching entries are found, security management engine 105 may designate the call session as a non-suspect call. Notably, this call session treatment designation can be stored locally on the NSSC 102 along with the other corresponding call session data indicated above.

In some embodiments, the call session data collected by the security management engine 105 is subsequently provided to a signaling firewall. The security management engine 105 can be configured to supply the call session data per a predefined frequency or triggered by an event. In some embodiments, security management engine 105 can be configured to establish and/or utilize an application programming interface (API) to communicate call session data with the signaling firewall 108. For example, the API can include a representational state transfer (REST) API. In some embodiments, signaling firewall 108 can store the call session data received from security management engine 105 in a local call session database 122 (as described above).

In addition, signaling firewall 108 is configured to receive (via other network elements) call signaling messages from calling party devices, such as user equipment 112, in the communications network 100. In some embodiments, user equipment 112 may include any mobile device that is utilized directly by a mobile subscriber end-user to receive or transmit data, such as a hand-held smart phone, a mobile station, a laptop computer equipped with a mobile broadband adapter, or any other like portable device. In some embodiments, user equipment 112 is roaming in a foreign network and is communicatively connected (e.g. attached) to MME 106 via an eNodeB (not shown). For example, user equipment 112 can utilize a radio interface to establish a wireless connection with an eNodeB, which in turn is connected to MME 106.

In some embodiments, MME 106 serves as a control-node for a long-term evolution (LTE) access-network. MME 106 serves to monitor and manage the bearer activation/deactivation process and is responsible for selecting the signaling gateway (SGW) (not shown) that services user equipment 112 at the initial attachment and during intra-LTE handovers. MME 106 is also responsible for authenticating the mobile subscriber associated with user equipment 112 (e.g., by interacting with an HSS, which is a master subscription database for each home network that maintains records of user equipment devices that are registered to the home network). The use of an HSS avows a network to grant or refuse user access to different services dependent on the mobile subscriber's status.

In some embodiments, MME 106 is communicatively connected to signaling firewall 108. Signaling firewall 108 may include any router device or network element with firewall capabilities (e.g., a session border controller (SBC), a Diameter routing agent, an SS7 firewall device, a Diameter signaling router (DSR), etc.) that is configured to relay update location messages that enter or depart its network. For example, signaling firewall 108 can be configured to receive Diameter Authentication Information Request (AIR) messages and Diameter Update Location Request (ULR) messages. In other embodiments, signaling firewall 108 is configured to process hypertext transfer protocol (HTTP) and/or 5G based location update signaling messages.

In some embodiments, the term "update location request message" refers to a Diameter based signaling message for updating a location of a mobile subscriber in a home subscriber server (HSS) of telecommunications network. An update location request message is intended to include Diameter ULR messages or any other message for updating the location of a telecommunications network subscriber with the network. In some embodiments, the ULR message is a S6a/d interface message that is communicated from the MME to the signaling firewall for the purposes of updating the location of the mobile subscriber's user equipment 112 within network 100.

Likewise, an AIR message is intended to include Diameter authentication information request information messages or any other message for authentication a mobile subscriber. In some embodiments, the AIR message is a S6a/d interface message that is used between the MME (and/or SGSN) and signaling firewall 108 for the purposes of authenticating the mobile subscriber's user equipment 112 upon it being activated in or roaming in a non-home network. Each update location request message includes an identifier, such as an international mobile subscriber identity (IMSI), Mobile Station Integrated Services Digital Network (MSISDN) identifier, and/or International Mobile Equipment Identity (IMEI) that identifies a mobile subscriber and/or the subscriber's user equipment 112. The ULR message and the AIR message may also include a visited public and mobile network (VPLMN) identifier, which includes location information. For example, the VPLMN identifier contains location information that identifies the mobile network operator (MNO) of the message sender. Further, a mobile country code (MCC) identifier, which identifies the country associated with the message sender, can be extracted from the VLPMN identifier included in the ULR or AIR message by signaling firewall 108. In some embodiments, the ULR message and AIR message can also include a mobile network code (MNC) identifier.

Although not explicitly shown in FIG. 1, signaling firewall 108 may include one or more processors, such as a central processing unit (e.g., a single core or multiple processing cores), a microprocessor, a microcontroller, a network processor, an application-specific integrated circuit (ASIC), or the like. Signaling firewall 108 may also include memory. Memory may comprise random access memory (RAM), flash memory, a magnetic disk storage drive, and the like. In some embodiments, memory may be configured to store a rules-based engine 118. Notably, rules-based engine 118 in memory can perform various monitoring, management, and/or remediation functionalities for signaling firewall 108 when executed by one or more processors.

In some embodiments, rules-based engine 118 can include a software component that is responsible for initiating the disclosed location and timestamp security countermeasure operation (e.g., a location verification assessment) to ULR messages and/or AIR messages received by signaling firewall 108. As described in greater detail below, signaling firewall 108 can receive an ingress ULR message from MME 106 in response to user equipment 112 entering or being activated in a foreign network. For the purposes of this example, it is understood that user equipment 112 was attached to a home network at some time prior to entering a visited/non-home network. In some embodiments, MME 106 communicates the ULR message to signaling firewall 108 via a Diameter S6a/d interface. In response to receiving the ULR message, signaling firewall 108 initiates rules-based engine 118, which is configured to extract timestamp information contained in the received ULR message. In particular, the timestamp serves as a time record which documents the time that the Diameter ULR message is sent by MME 106. In general and as used herein, timestamp information refers to any data that records the date and time of an event (e.g., an attachment event or the sending of a particular ingress signaling message).

In addition to obtaining the timestamp information, rules-based engine 118 is configured to identify the IMSI included in the received ingress ULR message. Furthermore, rules-based engine 118 can be configured to subsequently extract a VPLMN identifier from a received ULR message. In particular, rules-based engine 118 can examine the mobile country code (MCC) and/or the mobile network code (MNC) of the VPLM identifier in order to identify the location associated with the UE.

Once the VPLMN identifier is extracted from the ingress ULR message, rules-based engine 118 records the location information along with the IMSI (or other mobile subscriber information) and the timestamp information in local storage or in buffer memory. Notably, the IMSI and timestamp information can be used to cross-reference the entries of call session database 122, which includes entries of call session data received from NSSC 102 (which is described along with the database provisioning process below). The entries of call session database 122 may include mobile subscriber identifiers (e.g., IMSI), location information (e.g., PLMN identifier), timestamp information (e.g., call initiation time), and call designation information (e.g., suspect call flag vs. non-suspect call flag). In addition, if the call session was previously allowed by the NSSC 102, this information should be indicated in the call session data stored in call session database 122. Notably, such information can provide a higher confidence level that the mobile subscriber is actually in the area identified by the location information in the update location request message.

In some embodiments, rules-based engine 118 is configured to compare the location information contained in the update location request message with the location data included in the stored call session database (i.e., call session data received from NSSC 102) to find a location commonality. If a match is found in these two sets of location data, the update location request message may be scored with a high confidence level score (as opposed if there was no associated call session data for the location) by rules-based engine 118. In some embodiments, the location commonality is also determined using mobile subscriber/device identification information (e.g., IMSI) and proximate timestamp information. Use of this additional criteria assists rule-based engine 118 narrow the search scope of the stored call session data to identify the location commonality.

After locating one or more entries further containing the same IMSI, location, and proximate timestamp information (e.g., timestamps within a predefined time period, e.g., within the last two hours), rules-based engine 118 is configured to forward the signaling message information and call session data to security analytics engine 110.

As indicated above, network 100 further includes a security analytics engine 110. In some embodiments, security analytics engine 110 is configured to provide a monitoring function that involves analyzing the network traffic (e.g., call session data) on a consistent basis and subsequently reporting on any detected anomalies. In some embodiments, security analytics engine 110 is executed by a host server that is separate and distinct from signaling firewall 108 and NSSC 102 (and/or security management engine 105). Notably, security analytics engine 110 may include an API to each of signaling firewall 108 and security management engine 105. In alternate embodiments, security analytics engine 110 can be integrated into the signaling firewall or some other single platform network element.

In some embodiments, security analytics engine 110 is configured to correlate the call information from the security management engine 105 and the signaling firewall 108. For example, security analytics engine 110 may compare i) the IMSI, location information, and timestamp data obtained from the signaling message (e.g., ULR message) and ii) the IMSI, location information, and timestamp information corresponding to the provided call session data (which indicates the same IMSI and timestamp that is relatively close to the time indicated in the signaling message timestamp). If security analytics engine 110 can match or correlate the two instances of IMSI, location information, and timestamp information, then security analytics engine 110 can validate the mobile device location. For example, security analytics engine 110 can assign a score that is indicative of a high confidence level or likelihood that that mobile device is located in the area indicated by the ULR message. In some embodiments, security analytics engine 110 uses a trained machine learning model to correlate the timestamp information associated with each of the two instances of IMSI and location information to determine if the time difference between the two timestamps is indicative of a probable or improbable likelihood that the mobile subscriber is located at the location indicated in the location update information provided by the signaling firewall. For example, the processing conducted by security analytics engine 110 may be similar to a velocity check algorithm.

In contrast, if security analytics engine 110 cannot match or correlate the two instances of location information or if there is an absence of location information from security management engine 105, then security analytics engine 110 may determine that the mobile device location indicated by the update location request message data (i.e., signaling message data) provided by the signaling firewall is suspicious (i.e., derived a score indicative of low confidence or likelihood that that mobile device is located in the area indicated by the ULR message). Additional details of the security analytics engine is described below in the description pertaining to FIG. 3.

Figure 2:
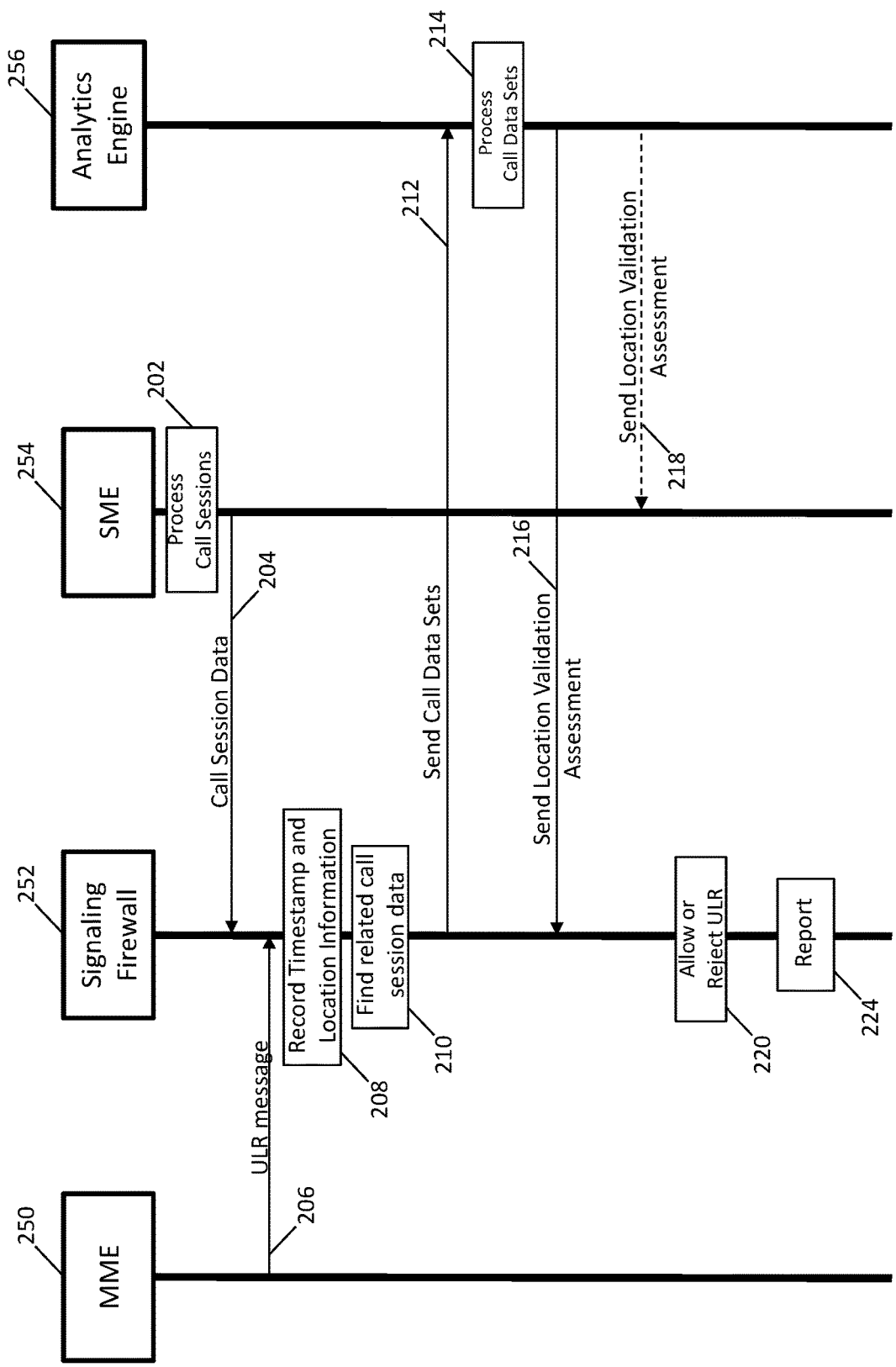
FIG. 2 is a signaling diagram illustrating the communication of messages for providing call intelligence to a signaling firewall in a communications network according to an embodiment of the subject matter described herein.

FIG. 2 is a signaling diagram illustrating the communication of messages for providing call intelligence to a signaling firewall in a communications network. Referring to block 202 of FIG. 2, security management engine 254 (e.g., similar in function to security management engine 105 described above and depicted in FIG. 1) receives and processes/handles a number of call sessions in an operator's network. In some embodiments, security management engine 254 is configured to utilize information obtained during the processing of the call session to determine the likelihood that the call session is suspicious or unsuspicious. For example, security management engine 254 may access a crowdsourced database (not shown) and use an IMSI to determine if a calling party number has been previously designated as suspect or the origin of robocalls.

After processing the call sessions, security management engine 254 is configured to forward call session data (e.g., IMSI, location information, timestamp information, and call treatment designation type) to signaling firewall 252 (see message 204). In some embodiments, signaling firewall 252 saves the received call session data as an entry in a call session database.

After the call session data is stored locally at signaling firewall 252, signaling firewall 252 receives an update location request (ULR) message 206. More specifically, ULR message 206 is received in response to a user equipment entering or being activated in a visited network. In response, the user equipment sends an attachment request message to MME 250 via an eNodeB (not shown). After receiving the attachment request, MME 250 generates and sends ULR message 206 to signaling firewall 252. After receiving ULR message 206, signaling firewall 252 records a timestamp of received ULR message 206 (see block 208). Signaling firewall 252 is also configured to extract mobile device identification information (e.g., IMSI) and location information (e.g., VPLMN identifier).

After receiving ULR message 206 and recording the timestamp and location information, signaling firewall 252 is configured to access its local call session database to obtain related call session data previously provided by security management engine 254 (and/or the host NSSC). In some embodiments, signaling firewall 252 utilizes the IMSI and timestamp information contained in the ULR message 206 to find a database entry including a matching IMSI and a timestamp (e.g., call origination timestamp or call termination timestamp) that is proximate in time with the ULR timestamp information (e.g., timestamps within a predefined time period). In the event that at least one matching call session database entry is found, signaling firewall 252 is configured to forward the two data sets (i.e., IMSI, location, timestamp information, and call treatment designation type (optional) in the ULR message and the IMSI, location, IMSI, location, timestamp information, and call treatment designation type (optional) in the call session database entry) to the security analytics engine 256 over an API via message 212.

In response to receiving message 212, security analytics engine 256 is configured to process the data sets (see block 214) to determine the likelihood or confidence level that the location indicated in the ULR message is indicative of the true location of the subscriber's mobile device. In some embodiments, security analytics engine 256 utilizes a trained machine learning (ML) model to process the data sets received from signaling firewall 252.

After processing the data sets received from signaling firewall 252, security analytics engine 256 generates a location validation assessment message 216 that includes a location validation assessment resulting from the processing conducted by security analytics engine 256 (see block 214). For example, location validation assessment message 216 can indicate that the location included in the ULR message 206 is the true location of the mobile device with a high degree of confidence (e.g., a high score) or with a low degree of confidence (e.g., a low score). In some embodiments, security analytics engine 256 may optionally send a location validation assessment message 218 (which contains the same location validation assessment information in location validation assessment message 216) to security management engine 254.

After receiving location validation assessment message 216, signaling firewall 252 is configured to either reject or allow ULR message 206 (see block 220) based on the location validation assessment information provided by security analytics engine 256. For example, if the confidence score indicated by the location validation assessment is lower than a predetermined confidence score threshold value, then signaling firewall 252 is prepared to reject and/or block ULR message 206. In contrast, if the confidence score indicated by the location validation assessment is higher than or equal to the predetermined confidence score threshold value, then signaling firewall 252 is prepared to allow or forward ULR message 206 to the appropriate network element (e.g., a home subscriber server) in network 100. In some embodiments, signaling firewall 252 is configured to send a report message to a network operator regarding the location validation assessment (see block 222).

Figure 3:
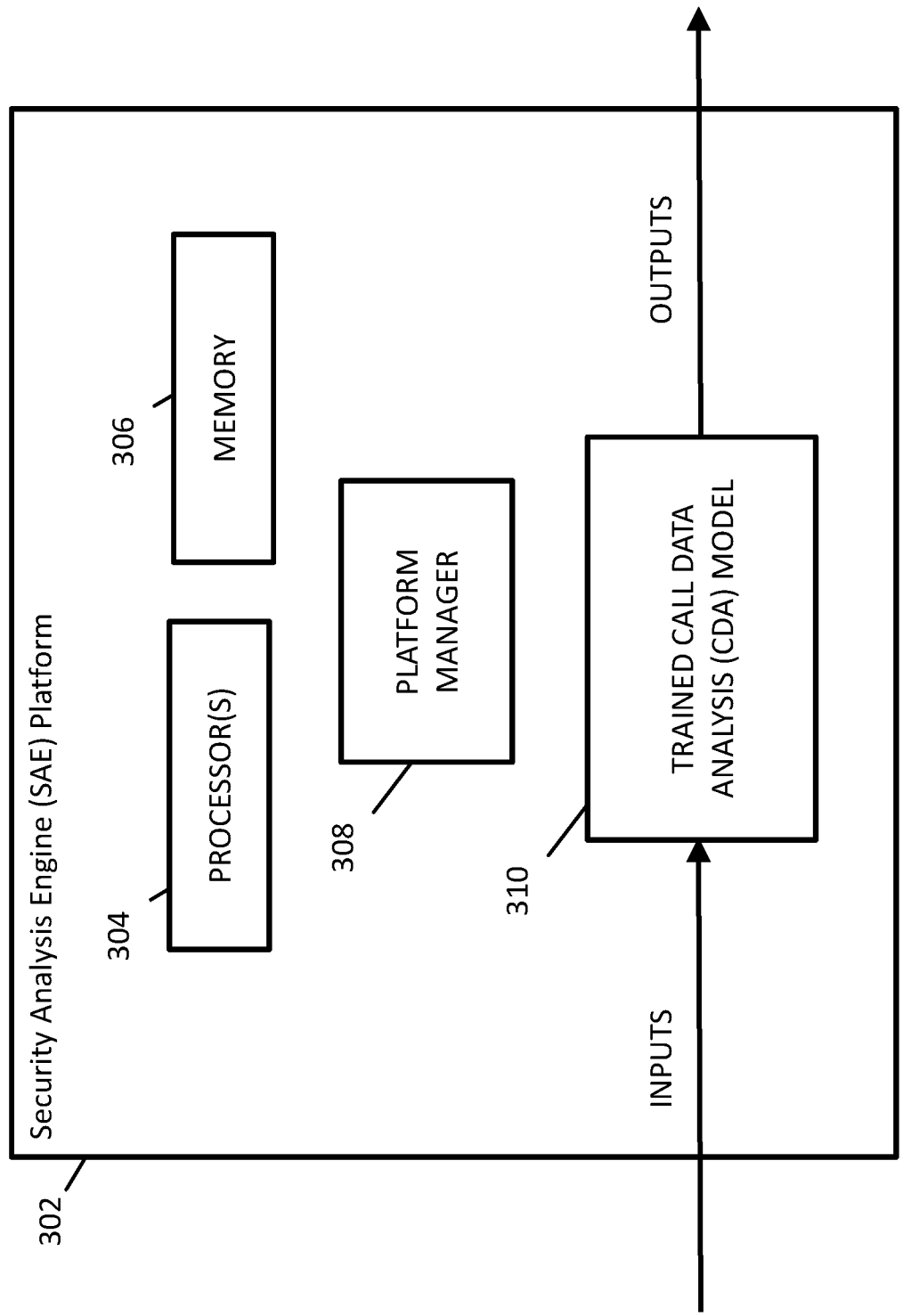
FIG. 3 is a block diagram of an example computing platform configured for utilizing machine learning for providing call intelligence to a signaling firewall in a communications network according to an embodiment of the subject matter described herein.

FIG. 3 is a block diagram of an example security analytics engine (SAE) platform 302 configured for utilizing machine learning to provide call intelligence to a signaling firewall in a communications network. In FIG. 3, security analytics engine platform 302 may include one or more processor(s) 304, such as a central processing unit (e.g., a single core or multiple processing cores), a microprocessor, a microcontroller, a network processor, an application-specific integrated circuit (ASIC), or the like. Security analytics engine platform 302 may also include memory 306. Memory 306 may comprise random access memory (RAM), flash memory, a magnetic disk storage drive, and the like. In some embodiments, memory 306 may be configured to store a platform manager 308 and a trained call data analysis (CDA) model 310. More specifically, trained call data analysis model 310 may reside on memory of security analytics engine platform 302 and be executable by processor(s) 304. Trained call data analysis model 310 may be configured to receive two sets of call data (e.g., IMSI, location information, timestamp data, and call designation type for each of the ULR message and the correlated call session data) as input data and may generate location validation assessment data as output. In some embodiments, platform manager 308 can be configured to provide the input data to call data analysis model 310. In some embodiments, platform manager 308 is a software algorithm or process that is configured to construct and/or generate call data analysis models (e.g., trained call data analysis model 310). Likewise, platform manager 308 can be configured to manage and/or execute the training of call data analysis models (e.g., trained call data analysis model 310) in the manner described above.

In some embodiments, call data analysis model 310 of security analytics engine platform 302 is configured to compare the timestamp and the location of the mobile device indicated in the ULR message to the timestamp data and location of the mobile device when the mobile device most recently initiated and/or terminated a call session (i.e., as indicated by the call session data). More specifically, a signaling firewall can send i) mobile subscriber identifier information, location identifier information, call initiation timestamp information, call termination timestamp information, and/or mobile identifier confidence level designation accessed from the stored call session data and ii) mobile subscriber identifier information, location identifier information, and update location request message receipt timestamp information contained in a received ULR message (along with mobile identifier confidence level designation) as input for its trained call data analysis model 310.

In some embodiments, the security analytics engine can utilize the timestamp and location information from the call session data and the update location request message to conduct a location likelihood analysis. For example, such a location likelihood analysis may include a determination as to whether the mobile subscriber is still likely in a first location (e.g., as indicated in the call session data and related timestamp data) that is similarly indicated in a UDR message (e.g., as indicated by the update location request message and timestamp data) within a reasonable amount of time (e.g., a predefined amount of travel time that has been established or trained into the security analytics engine as likely, possible, and/or reasonable). In particular, the security countermeasure is applicable to an outbound roaming mobile subscriber roaming into a visited network and is configured to compare the last known location information of the mobile subscriber by analyzing previous call session data and the current call signaling data (e.g., ULR message). Notably, the security analytics engine platform 302 and/or call data analysis model 310 can be configured to use the location information from the previously conducted call session data to determine the likelihood that the mobile subscriber is actually in the location or area indicated in the update location request message.

If the call data analysis model 310 determines that there is a high level of confidence for a mobile subscriber to still be at the location in the ULR message (e.g., using the time difference indicated by timestamp information), the security analytics engine platform 302 and/or call data analysis model 310 may consider such a determination as one factor that the mobile subscriber is still in the indicated location. Call data analysis model 310 may also consider the call designation type (i.e., data indicating the previous call session and/or update location request message is a suspicious call or a unsuspicious call) in its location validation assessment to determine the likelihood or confidence level that the update location request indicates the true location of the mobile device. For example, the call data analysis model 310 may designate the current update location request message from the visited network as being potentially suspicious if a low confidence level is derived or may designate the current ULR message from the visited network as being valid (i.e., not suspicious) if a high confidence level is derived.

It will be appreciated that FIG. 3 is for illustrative purposes and that various entities, their locations, and/or their functions may be changed, altered, added, or removed. For example, some entities and/or functions may be combined into a single entity. In another example, an entity and/or function may be located at or implemented by two or more entities.

Figure 4:
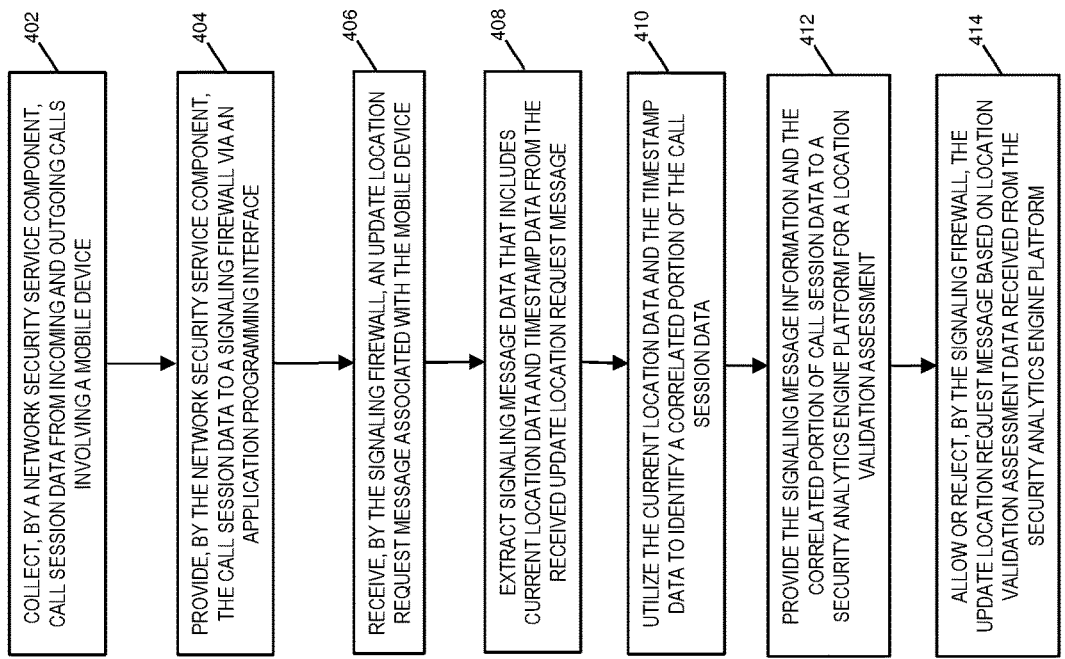
FIG. 4 is a flow chart illustrating an exemplary process for providing call intelligence to a signaling firewall in a communications network according to an embodiment of the subject matter described herein.

FIG. 4 is a flow chart illustrating an exemplary process or method 400 for providing call intelligence to a signaling firewall in a communications network according to an embodiment of the subject matter described herein. In some embodiments, method 400 depicted in FIG. 4 is an algorithm stored in memory that when executed by a hardware processor of a security management engine, signaling firewall, and/or a security analytics engine platform performs steps 402-412. In block 402, call session data is collected from incoming and outgoing calls involving a mobile device. In some embodiments, the NSSC and/or its security management engine is configured process incoming and outgoing call sessions involving a mobile subscriber's mobile device or user equipment. The NSSC is configured to collect call session data including at least one of a calling party number, a called party number, timestamp data, a call treatment designation, a location identifier, a mobile device type identifier, and originating carrier identifier, and a terminating carrier identifier that is associated with the call session(s).

In block 404, the call session data is provided by the network security service component to a signaling firewall via an application programming interface. In some embodiments, the NSSC and/or its security management engine is configured to utilize an API to deliver the call session data to the signaling firewall. In some embodiments, the call session data is stored in a local database at the signaling firewall.

In block 406, an update location request message associated with the mobile device is received. In some embodiments, a signaling firewall is configured to receive an update location request message related to the mobile device (and/or the mobile subscriber) mentioned in block 402.

In block 408, signaling message information that includes current location data and timestamp data is extracted from the received update location request message. In some embodiments, the signaling firewall is configured to extract at least the current location data (e.g., VPLMN identifier) and timestamp data from the received update location request message.

In block 410, the current location data and the timestamp data is utilized to identify a correlated portion of the call session data. In some embodiments, the signaling firewall is configured to correlate the current location data and timestamp data extracted from the update location request message with entries in the stored call session data. Notably, the signaling firewall sends the current location data and timestamp data of the update location request message along with related call session data. In some embodiments, the related call session data includes call session data that includes at least the same IMSI information and a proximate timestamp (i.e., a timestamp that is within a predefined time period of the current timestamp data indicated in the update location request message).

In block 412, the signaling message information and the correlated portion of call session data is provided to a security analytics engine platform for a location validation assessment. In some embodiments, the signaling firewall sends the current location and timestamp data extracted from the update location request message as well as the correlated location and timestamp data from the stored call session data. After receiving this signaling message information and associated call session data from the signaling firewall, the security analysis engine utilizes a machine learning model or component to conduct a location verification assessment.

In block 414, the update location request message is allowed or rejected by the signaling firewall based on location validation assessment data received from the security analytics engine platform. In some embodiments, the security analytics engine platform forwards location validation assessment data to the signaling firewall after conducting the location validation assessment. After receiving the location validation assessment data, the signaling firewall can make a determination as to whether the update location request message should be classified as a suspicious message or an unsuspicious message. For example, the location validation assessment data can include a confidence level score that indicates the likelihood as to whether or not the mobile device is located in the location specified in the update location request message. In some embodiments, the signaling firewall may be provisioned with a threshold value that can be compared to the confidence level score. If the confidence level score is greater or equal to the predefined threshold value, then the signaling firewall may be configured to allow the update location request message to proceed toward its original destination (e.g., a home network HSS). If the confidence level score is less than the predefined threshold value, then the signaling firewall may be configured to designate the update location request message as suspicious and thereby reject or block the update location request message from entering the network.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing call intelligence to a signaling firewall in a communications network, the method comprising:

collecting, by a network security service component, call session data from incoming and outgoing calls involving a mobile device, the call session data including location data, an identifier of the mobile device and/or a mobile subscriber of the mobile device, and timestamp data;

providing, by the network security service component, the call session data to a signaling firewall via an application programming interface (API);

receiving, by the signaling firewall, an update location request message associated with the mobile device;

extracting signaling message information that includes current location data, an identifier of the mobile device and/or a mobile subscriber of the mobile device, and timestamp data from the received update location request message;

utilizing the identifier and the current location data and/or the timestamp data from the received update location request message to identify a correlated portion of the call session data;

providing the signaling message information and the correlated portion of the call session data to a security analytics engine platform for a location validation assessment; and allowing or rejecting, by the signaling firewall, the update location request message based on location validation assessment data received from the security analytics engine platform;

wherein the security analytics engine platform includes a machine learning component configured to formulate the location validation assessment based on the signaling message information and associated call session data received from the signaling firewall.

2. The method of claim 1 wherein the signaling message information further includes mobile subscriber identification information corresponding to the mobile device.

3. The method of claim 1 wherein the identifier of the mobile device and/or the subscriber of the mobile device includes at least one of a calling party number and a called party number and the call session data further includes a call treatment designation, a mobile device type identifier, an originating carrier identifier, and a terminating carrier identifier.

4. The method of claim 1 wherein the call session data relates to update location request messages previously received by the signaling firewall.

5. The method of claim 1 including rejecting the update location request message in response to utilizing the location validation assessment data to designate the update location request message as a suspicious message.

6. The method of claim 1 wherein the security analytics engine platform executes the location validation assessment by comparing the current location data and timestamp information included in the signaling message information with location identifier and timestamp data included in the call session data.

7. A system for providing call intelligence to a signaling firewall in a communications network, the system comprising:

a network security service component configured for collecting call session data from incoming and outgoing calls involving a mobile device, the call session data including location data, an identifier of the mobile device and/or a mobile subscriber of the mobile device, and timestamp data;

a signaling firewall configured for receiving the call session data from the network security service component, receiving an update location request message associated with the mobile device, extracting signaling message information that includes current location data, an identifier of the mobile device and/or a mobile subscriber of the mobile device, and timestamp data from the received update location request message, and utilizing the identifier and the current location data and/or the timestamp data from the received update location request message to identify a correlated portion of the call session data; and a security analytics engine platform configured to receive the signaling message information and the correlated portion of the call session data from the signaling firewall, performing a location validation assessment based on the received signaling message information and correlated portion of the call session data, and providing location validation assessment data to the signaling firewall, wherein the signaling firewall is configured to allow or reject the update location request message based on the location validation assessment data;

wherein the security analytics engine platform includes a machine learning component configured to formulate the location validation assessment based on the signaling message information and associated call session data received from the signaling firewall.

8. The system of claim 7 wherein the signaling message information further includes mobile subscriber identification information corresponding to the mobile device.

9. The system of claim 7 wherein the identifier of the mobile device and/or the subscriber of the mobile device includes at least one of a calling party number and a called party number and the call session data further includes a call treatment designation, a mobile device type identifier, an originating carrier identifier, and a terminating carrier identifier.

10. The system of claim 7 wherein the call session data relates to update location request messages previously received by the signaling firewall.

11. The system of claim 7 wherein the signaling firewall is further configured for rejecting the update location request message in response to utilizing the location validation assessment data to designate the update location request message as a suspicious message.

12. The system of claim 7 wherein the security analytics engine platform executes the location validation assessment by comparing the current location data and timestamp information included in the signaling message information with location identifier and timestamp data included in the call session data.

13. A non-transitory computer readable medium having stored thereon executable instructions that when executed by a processor of a computer controls the computer to perform steps comprising:

collecting, by a network security service component, call session data from incoming and outgoing calls involving a mobile device, the call session data including location data, an identifier of the mobile device and/or a mobile subscriber of the mobile device, and timestamp data;

providing, by the network security service component, the call session data to a signaling firewall via an application programming interface (API);

receiving, by the signaling firewall, an update location request message associated with the mobile device;

extracting signaling message information that includes current location data, an identifier of the mobile device and/or a mobile subscriber of the mobile device, and timestamp data from the received update location request message;

utilizing the identifier and the current location data and/or the timestamp data from the received update location request message to identify a correlated portion of the call session data;

providing the signaling message information and the correlated portion of the call session data to a security analytics engine platform for a location validation assessment; and allowing or rejecting, by the signaling firewall, the update location request message based on location validation assessment data received from the security analytics engine platform;

wherein the security analytics engine platform includes a machine learning component configured to formulate the location validation assessment based on the signaling message information and associated call session data received from the signaling firewall.

14. The non-transitory computer readable medium of claim 13 wherein the signaling message information further includes mobile subscriber identification information corresponding to the mobile device.

15. The non-transitory computer readable medium of claim 13 wherein the identifier of the mobile device and/or the subscriber of the mobile device includes at least one of a calling party number and a called party number and the call session data further includes a call treatment designation, a mobile device type identifier, an originating carrier identifier, and a terminating carrier identifier.

16. The non-transitory computer readable medium of claim 13 wherein the call session data relates to update location request messages previously received by the signaling firewall.

17. The non-transitory computer readable medium of claim 13 including rejecting the update location request message in response to utilizing the location validation assessment data to designate the update location request message as a suspicious message.

* * * * *